(12) United States Patent
Maris

(10) Patent No.: US 6,946,604 B1
(45) Date of Patent: Sep. 20, 2005

(54) TEMPLATE FOR PREPARING A WIRE HARNESS

(76) Inventor: George P. Maris, 2701 Rutgers Dr., Panama City, FL (US) 32405

( * ) Notice: Subject to any disclaimer, the term of this patent is extended or adjusted under 35 U.S.C. 154(b) by 0 days.

(21) Appl. No.: 10/668,306

(22) Filed: Sep. 22, 2003

(51) Int. Cl.$^7$ .......................... H02G 1/06; H01R 43/00
(52) U.S. Cl. ...................... 174/72 A; 174/68.1; 174/97; 29/33 F; 29/755; 29/825; 29/850; 269/903
(58) Field of Search .......................... 174/72 A, 72 R, 174/68.1, 68.3, 95–97, 99 R, 135; 29/33 F, 755, 825, 850, 857; 269/903

(56) References Cited

U.S. PATENT DOCUMENTS

| | | | | |
|---|---|---|---|---|
| 3,946,768 A | * | 3/1976 | Fiorentino .................... | 29/755 |
| 4,051,383 A | * | 9/1977 | Dola ......................... | 174/72 A |
| 4,122,357 A |   | 10/1978 | Sumida | |
| 4,424,627 A | * | 1/1984 | Tarbox ........................ | 29/755 |
| 4,531,283 A | * | 7/1985 | Kitchens et al. .............. | 29/755 |
| 4,711,025 A | * | 12/1987 | DeSanto .................... | 174/72 A |
| 4,831,726 A |   | 5/1989 | Moly | |
| 4,864,082 A | * | 9/1989 | Ono et al. ..................... | 174/97 |
| 4,965,929 A | * | 10/1990 | Aligue ......................... | 29/755 |
| 5,330,120 A | * | 7/1994 | Tussing .................... | 242/588.2 |
| 5,338,014 A | * | 8/1994 | Kitamura .................... | 269/903 |
| 5,401,905 A | * | 3/1995 | Lesser et al. ................. | 174/97 |
| 5,597,980 A | * | 1/1997 | Weber ...................... | 174/72 A |
| 5,895,889 A |   | 4/1999 | Uchida et al. | |
| 5,965,951 A |   | 10/1999 | Moore et al. | |
| 6,272,746 B1 | * | 8/2001 | Mori .......................... | 269/903 |

* cited by examiner

Primary Examiner—Dean A. Reichard
Assistant Examiner—Adolfo Nino
(74) Attorney, Agent, or Firm—Peter Loffler

(57) ABSTRACT

A template for preparing a wiring harness allows for quick and accurate preparation of the harness for subsequent installation within a vehicle. The template has a base member with one or more stations attached thereto, the stations having channels and some discontinuities located on the side walls that form the channels. The harness is assembled within the channels and individual wire runs protrude through a particular discontinuity.

16 Claims, 4 Drawing Sheets

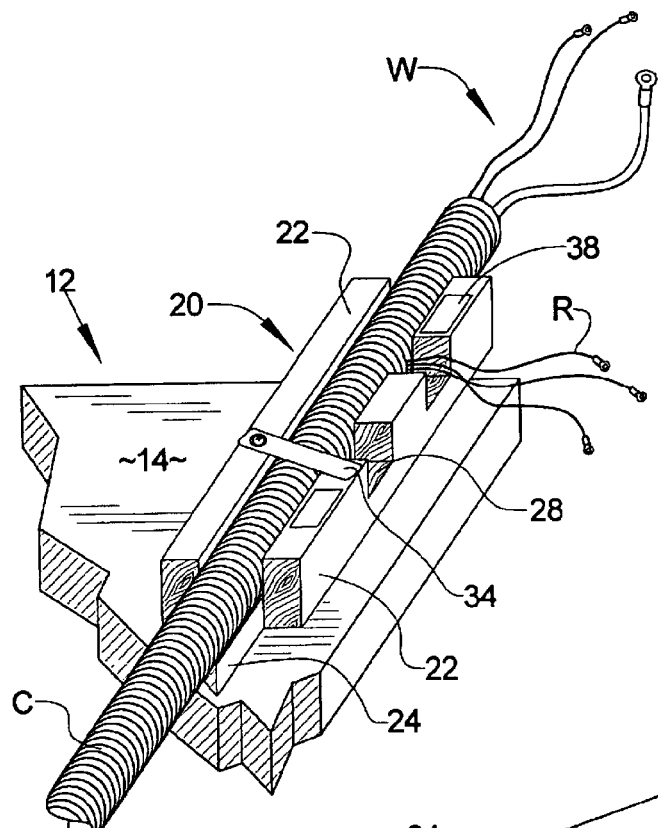
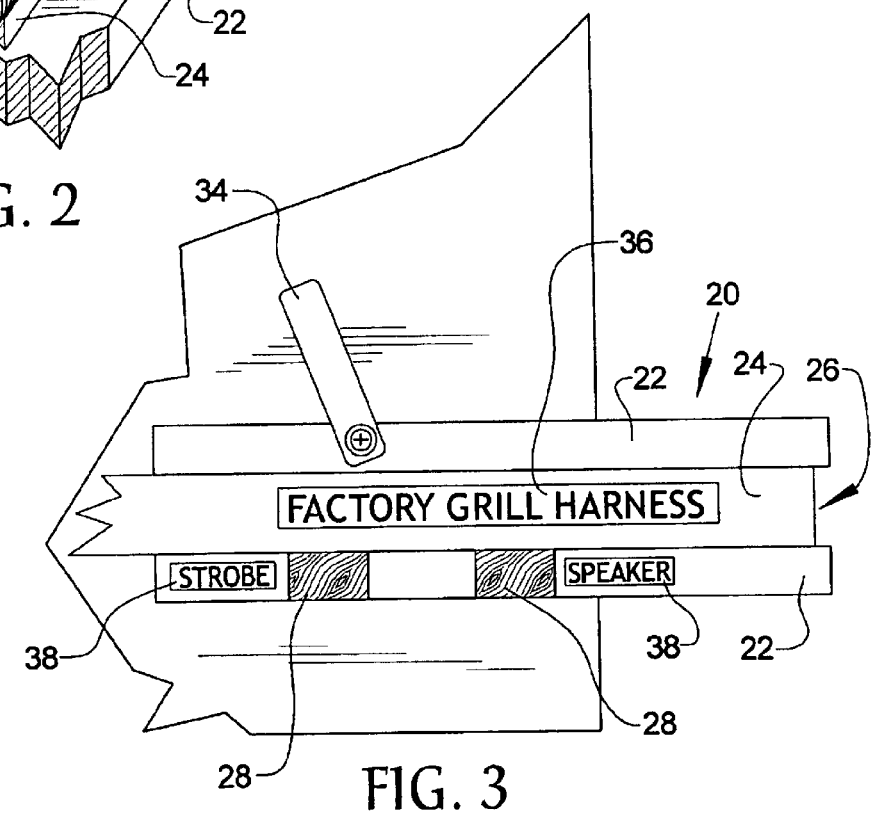

TEMPLATE FOR PREPARING A WIRE HARNESS

BACKGROUND OF THE INVENTION

1. Field of the Invention

The present invention relates to a template that is used to construct an after-market wiring harness for use in vehicles that have wiring needs beyond those provided by the manufacturer of the vehicle.

2. Background of the Prior Art

Many vehicles, such as police cars, the fire chief's car, tow trucks, and construction site trucks, have various devices installed onto the vehicle after the vehicle is built in standard fashion at the factory. Such after-market devices include computer terminals, various lights and light bars, sirens, communication radios, etc. Typically, the car is manufactured in standard fashion and delivered to the end user with these various after-market devices installed after the original vehicle manufacturing has occurred. This is due to the fact that each particular end user has differing needs from similar end users and the custom installation of differing devices for a particular end user is very cost-prohibitive to a large vehicle manufacturer. This is especially true in light of the fact that there are a myriad of devices that can be installed (for example, there are a large number of different types of light bars that can be installed onto the roof of a police car) and inventorying and having the knowledge base to perform each such installation in a large vehicle manufacturing plant that relies on a fast moving assembly line is quite daunting.

Accordingly, the vehicles are customized to the specifications of a particular end user after the original vehicle has left the factory. A customization shop is employed to perform the installation of the desired devices for a particular vehicle. This customization shops receives the specifications from the end user and installs the devices in a cost-effective manner. The customization shop carries the knowledge base for installation requirements for each product to be installed or can acquire the knowledge as new products are introduced, in a more efficient manner than can be achieved at the vehicle factory.

Typically, one of the first steps taken in the customization process for electrical and electronic components to be installed, once the device architecture is finalized, is to run electrical wire from the vehicle's electrical power source to the approximate point of each product to be installed so that as each product is installed, it can be electrically coupled to its appropriate wire in order to couple that device to the vehicle's source of electrical power. One method utilized to accomplish the installation of the wire is to install each run of wire individually in sequence, until all the necessary wiring runs are made. However, this method is time consuming as each run has to overcome various hurdles, such as passing through the fire wall of the vehicle or being inserted into the roof pillar of the vehicle. Additionally, having many individual runs of wires installed can create a messy and cluttered effect.

To combat these problems, many customization shops will precut each wire run that is needed, and once so cut, assemble all of the runs into a wiring harness, place the wiring harness into a conduit, and install the complete harness in the vehicle. This allows the installer to have to make only one pass through the fire wall, one installation into the vehicle's roof pillar, etc. Additionally, the wiring harness leaves all of the wires so installed, compact and organized. This is achievable due to the fact that only a handful of vehicles are typically used for special service vehicles, such as police cars, and each vehicle of a specific type has the same dimensions. The distance from the electrical power source to the back lights of the vehicle that need to continuously flash during pursuit or to the point where a computer will sit for use by a police officer is identical for each vehicle of a particular type. Therefore, if the vehicle is to receive front and rear flashing lights (wigwag), both original factory and added blue and/or red, a light bar, a siren, a computer, and a two-way radio, the customization shop can quickly ascertain the wiring run distance needed for each such device and can assemble a wire harness, place the harness into a conduit, and install the wire harness and conduit as a unit into the vehicle.

The problem with this method is that during the cutting process, mistakes in measurement with respect to the length of an individual wiring run can be made, or mistakes in measurement with respect to the turn out point from the main harness for a particular wiring run can be made. As such mistakes may not be caught until late in the installation process and as many end users have requirements that all after-market wiring be contained within the conduit of the wiring harness, such mistakes can be time-consuming and costly.

Therefore, there exists a need in the art for a system that can allow a customization shop to completely and accurately prepare a wiring harness for after-market installation of various electrical components, which system overcomes the above stated problems found in the art. Such a system must allow quick and accurate measurement of each particular wiring run without the need to resort to bulky manuals and with minimal possibility of leaving a particular run short. Such a system must allow a customization shop to assemble the wiring harness per specifications and thereafter to encase the completed harness into a conduit for subsequent installation into a vehicle. Ideally, such a system will allow for dynamic adjustment of the length of the runs in the event that the size of the vehicle changes or if a change of placement within the vehicle of some electric devices occurs.

SUMMARY OF THE INVENTION

The template for preparing a wiring harness of the present invention addresses the aforementioned needs in the art. The template for preparing a wiring harness allows a customization shop to completely and accurately prepare a wiring harness for after-market installation of various electrical components into a vehicle. The template for preparing a wiring harness allows for quick and accurate measurement of each particular wiring run that makes up the overall harness without the need to resort to bulky manuals for measurement guidelines and with minimal possibility that a particular run short will be cut short. The present invention allows a customization shop to assemble the wiring harness per specifications and thereafter to encase the completed harness into a conduit for subsequent installation into the vehicle. The template for preparing a wiring harness allows for dynamic adjustment of the lengths of the runs in the event that the size of the vehicle changes or if a change of placement within the vehicle of some electric devices occurs.

The template for preparing a wiring harness of the present invention is comprised of a base member having a top surface and a bottom surface. A station is provided and has a pair of flanges that form a channel. Some of the flanges have a discontinuity along each particular flange's length. Multiple similar, though not necessarily identical, stations can be provided and each is attached to the top surface of the base member. The attachment of each station to the base member may be removable and may be facilitated by a pegboard style attachment system. A wiring harness is made from a plurality of individual wiring runs and is assembled within the channels formed by the various flanges of the stations and at least one of the individual wiring runs protrude through the at least one discontinuity located on some of the flanges in order to signify its proper point of departure from the main harness for connection with an electrical component once installed within the vehicle. Stops are provided and are rotatably attached to some of the flanges such that each stop can rotate between a first position wherein the stop covers the top of the respective channel and prevents the wiring harness therein from being withdrawn therefrom, and a second position wherein the stop does not cover the respective channel. Labels may be provided proximate each discontinuity to identify the nature of the discontinuity and also within each channel to identify the nature of the respective station. At least one stanchion is attached to the top surface of the base member and receives a wiring spool thereon.

BRIEF DESCRIPTION OF THE DRAWINGS

FIG. 2 is a close-up perspective view, taken from detail 2 in FIG. 1, of one of the stations of the template for preparing a wiring harness.

FIG. 3 is a top plan view of one of the stations.

Similar reference numerals refer to similar parts throughout the several views of the drawings.

DESCRIPTION OF THE PREFERRED EMBODIMENT

Figure 1:
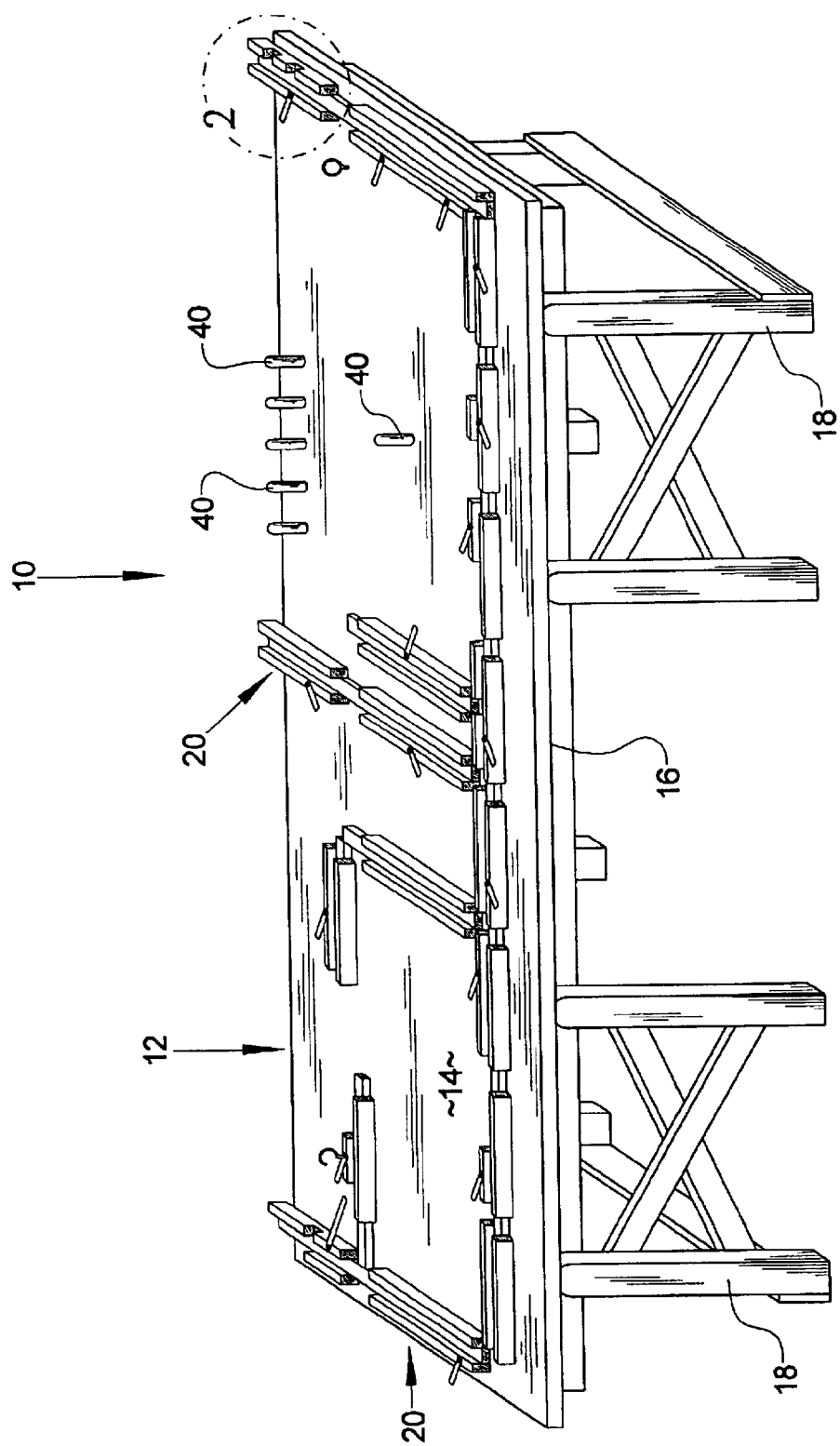
FIG. 1 is a perspective view of the template for preparing a wiring harness of the present invention.
Figure 4:
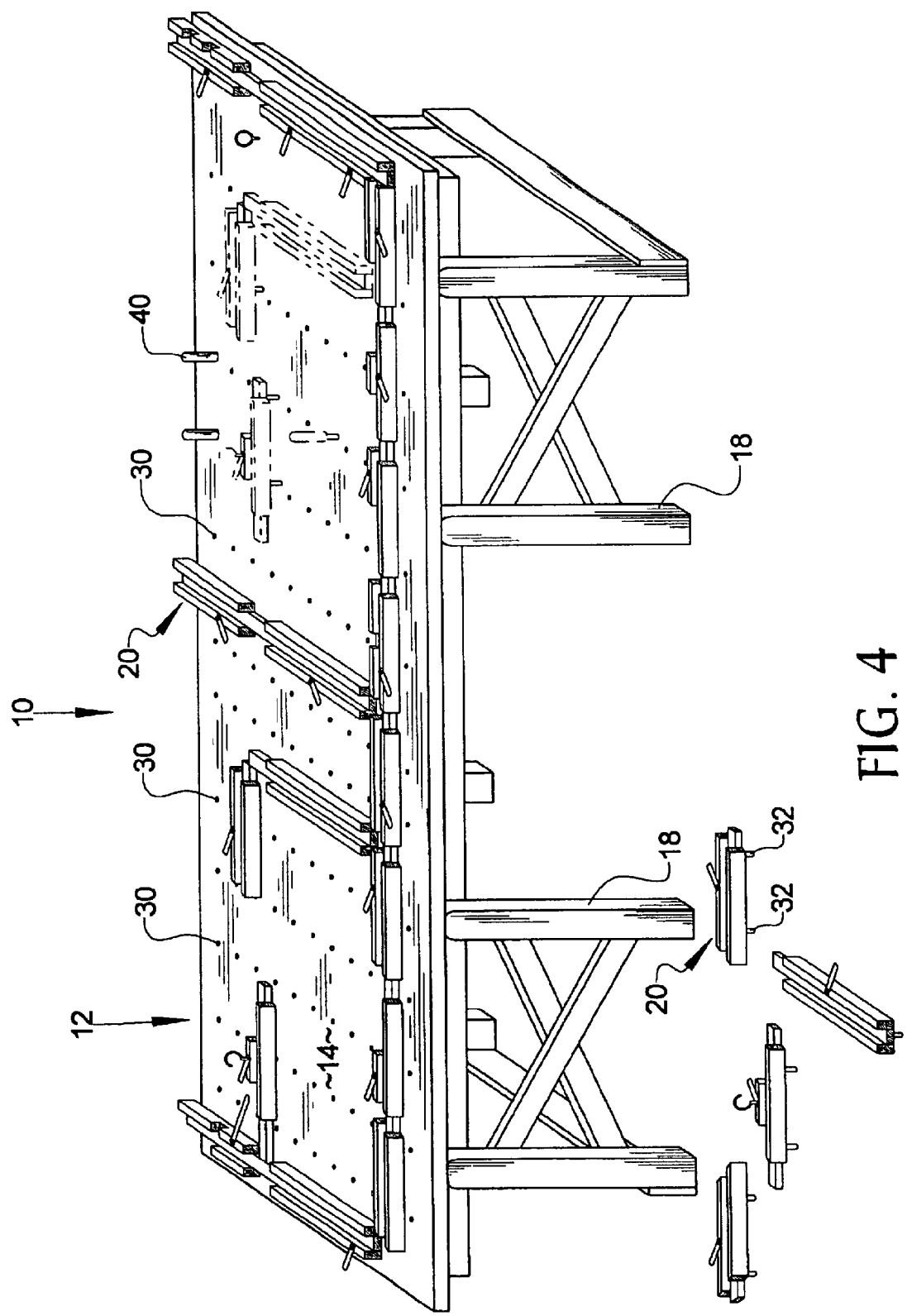
FIG. 4 is a perspective view of the template for preparing a wiring harness of the present invention allowing for rapid relocation of the stations.
Figure 5:
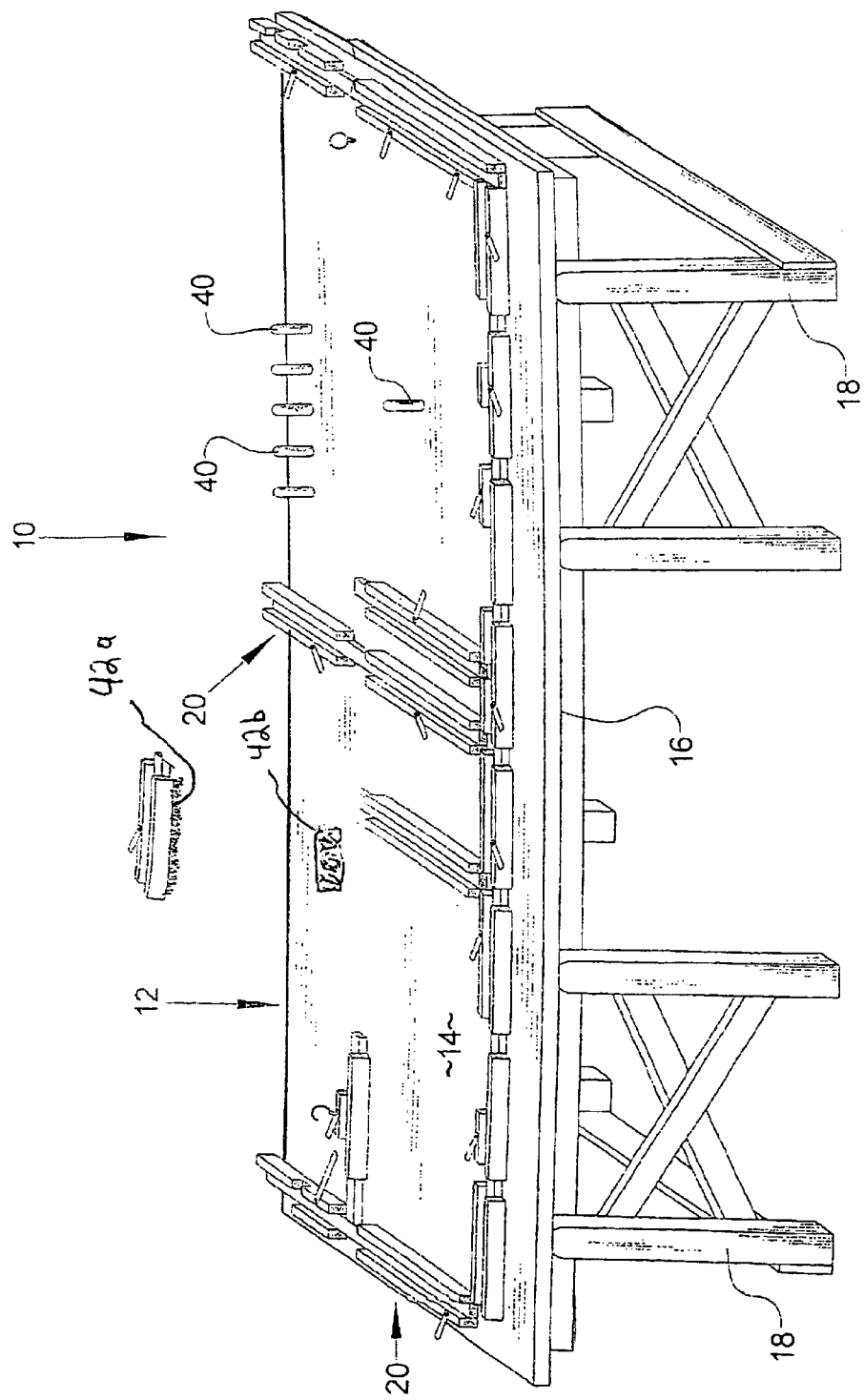
FIG. 5 is a perspective view of the template for preparing a wiring harness of the present invention allowing for rapid relocation of the stations using cooperating hook and loop material for attachment of the stations to the base member.

Referring now to the drawings, it is seen that the template for preparing a wiring harness, generally denoted by reference numeral 10, is comprised of a base member 12 having a generally flat top surface 14 and a bottom surface 16. The base member 12 may be laid upon an appropriate work surface such as a table or may be provided with its own legs 18 in order to allow the device 10 to be freestanding. A station 20 is provided and has a pair of flanges 22 joined by a floor 24 that form a channel 26. Some of the flanges 22 have a discontinuity 28 along each particular flange's length. Multiple similar stations 20 can be provided and each is attached to the top surface 14 of the base member 12. The attachment of each station 20 to the base member 12 may be removable and may be facilitated by a pegboard style attachment system, as best illustrated in FIG. 4, wherein the top surface 14 of the base member 12 is provided with a plurality of female openings 30 and each station 20 is provided with corresponding pegs 32 for removable receipt within some of the openings 30. Alternately, removable attachment of each station 20 to the base member may be facilitated by using a first portion of cooperating hook and loop material 42a on the station 20 and a corresponding second portion of hook and loop material 42b on the base member 12 that matingly receives the first portion of hook and loop material 42a.

In order to use the template for preparing a wiring harness 10 of the present invention, one or more stations 20 are positioned on the base member 12 and represent the overall length of a wiring harness W to be manufactured. If necessary, additional stations 20 are provided for branch lines of the harness W and sub-branch lines. The stations 20 are designed such that each discontinuity represents the appropriate point of departure of an individual wire run R from the main wiring harness W. For example, if the particular harness W calls for a speaker on the factory grill, an individual wiring run R protrudes through the conduit C holding the main harness W and passes through the appropriately labeled discontinuity 28 located on one of the flanges 22 of that particular station 20 which is also appropriately labeled for ease of construction of the overall network of stations 20. Each individual wiring run R that branches out from the main harness W is prepared in similar fashion. A small stop 34 can be rotatably attached to some of the flanges 22 such that the stop 34 can rotate from a first position wherein it sits over the particular channel 26 and prevents the conduit C and harness W from popping out of the particular channel 26 and a second position wherein the stop 34 does not sit over the channel 26 allowing the conduit C with harness W be inserted into and removed from the channel 26. Several such stops 34 can be provided at various points along the assembled stations 20.

The present invention 10 allows workers to assemble the various stations 20 onto the base member 12 in order to conform to the architecture needed for the particular vehicle that is the target of the wiring harness W to be assembled. The labels 36 with the channels 26 help the workers quickly select each needed station 20. Thereafter, the conduit C or conduits are placed into the channels 26. Thereafter, each individual wiring run R is placed, in turn, through the conduit C. As each run R is so placed, its branch label 38 is found and an opening is made on the conduit C at the appropriate discontinuity 28, and that individual run R is pulled therethrough. This process is repeated until each run R is part of the overall harness W at which time the harness W is installed in the vehicle. The system allows the workers to systematically assemble the harness W with each run R being branched at the appropriate location along the harness W.

If the stations 20 are removably attached to the base member 12, then the architecture of the overall system can be quickly reconfigured in response to a change in size or specifications of the vehicle or to a change in the position of a particular piece of equipment to be wired.

At least one stanchion 40 can be attached to the top surface 14 of the base member 12 for receiving a spool of wire (not illustrated) thereon.

While the invention has been particularly shown and described with reference to an embodiment thereof, it will be appreciated by those skilled in the art that various changes in form and detail may be made without departing from the spirit and scope of the invention.

I claim:

1. A template comprising:
   a base member having a top surface and a bottom surface;
   a station, having a pair of straight flanges forming a straight channel, at least one of the flanges having a discontinuity medially along the flange's length, the station attached to the top surface of the base member such that the station is in direct contact with the top surface and the station can be positioned in various locations on the top surface and in a variety of orientations with respect to the base member; and wherein a wiring harness made from a plurality of individual wiring runs, is assembled within the channel formed by the flanges and at least one of the individual wiring runs protrude through the discontinuity located on at least one of the flanges and such that after the wiring harness is assembled within the channel, the wiring harness is removed from the channel.

2. The template as in claim 1 wherein a stop is rotatably attached to one of the flanges such that the stop rotates between a first position wherein the stop covers the top of the channel and prevents the wiring harness therein from being removed, and a second position wherein the stop does not cover the channel such that the axis of rotation of the stop is generally normal with respect to the top surface of the base member.

3. The template as in claim 1 wherein a first label is located proximate the discontinuity to identify the nature of the discontinuity.

4. The template as in claim 3 wherein a second label is located within the channel to identify the nature of the station.

5. The template as in claim 1 further comprising a stanchion attached to the top surface of the base member for receiving a spool thereon.

6. The template as in claim 1 wherein the station is removably attachable to the top surface of the base member.

7. The template as in claim 1 wherein the station is removably attachable to the top surface of the base member by providing the station and the base member with a pegboard-type attachment system.

8. The template as in claim 1 wherein the station is removably attachable to the top surface of the base member by providing the station with a first portion of cooperating hook and loop material and providing the base member with a second portion of hook and loop material that matingly receives the first portion of hook and loop material.

9. A template comprising:

a base member having a top surface and a bottom surface;

a first station, having a first pair of straight flanges forming a straight first channel, the first station attached to the top surface of the base member such that the first station is in direct contact with the top surface and the station can be positioned in various locations on the top surface and in a variety of orientations with respect to the base member;

a second station, having a second pair of straight flanges forming a straight second channel, the second station attached to the top surface of the base member in spaced apart relationship with respect to the first station and such that the second station is in direct contact with the top surface and the station can be positioned in various locations on the top surface and in a variety of orientations with respect to the base member;

at least one discontinuity medially located on the first pair of flanges or the second pair of flanges; and wherein a wiring harness made from a plurality of individual wiring runs, is assembled within the first channel formed by the first pair of flanges and the second channel formed by the second pair of flanges and at least one of the individual wiring runs protrude through the at least one discontinuity and such that after the wiring harness is assembled within the channels, the wiring harness is removed from the channels.

10. The template as in claim 9 wherein a stop is rotatably attached to the first pair of flanges or the second pair of flanges such that the stop rotates between a first position wherein the stop covers the top of the respective channel and prevents the wiring harness therein from being removed, and a second position wherein the stop does not cover the respective channel such that the axis of rotation of the stop is generally normal with respect to the top surface of the base member.

11. The template as in claim 9 wherein a first label is located proximate the discontinuity to identify the nature of the discontinuity.

12. The template as in claim 11 wherein a second label is located within the first channel to identify the nature of the first station and a third label is located within the second channel to identify the nature of the second station.

13. The template as in claim 9 further comprising a stanchion attached to the top surface of the base member for receiving a spool thereon.

14. The template as in claim 9 wherein the first station and the second station are each removably attachable to the top surface of the base member.

15. The template as in claim 9 wherein the first station and the second station are each removably attachable to the top surface of the base member by providing the first station and the second station and the base member with a pegboard-type attachment system.

16. The template as in claim 9 wherein the station is removably attachable to the top surface of the base member by providing the station with a first portion of cooperating hook and loop material and providing the base member with a second portion of hook and loop material that matingly receives the first portion of hook and loop material.

* * * * *